United States Patent
Fujita et al.

(10) Patent No.: US 10,369,909 B2
(45) Date of Patent: Aug. 6, 2019

(54) SURFACE FASTENER, CUSHIONING STRUCTURE, AND SEAT STRUCTURE

(71) Applicants: DELTA TOOLING CO., LTD., Hiroshima-shi (JP); KURARAY FASTENING CO., LTD., Osaka-shi (JP)

(72) Inventors: Etsunori Fujita, Higashihiroshima (JP); Yumi Ogura, Higashihiroshima (JP); Seiji Kawasaki, Higashihiroshima (JP); Shigeki Wagata, Hiroshima (JP); Yukitoshi Higashinaka, Sakai (JP); Satoru Ono, Sakai (JP); Tooru Tanokura, Osaka (JP)

(73) Assignees: DELTA TOOLING CO., LTD., Hiroshima-shi (JP); KURARAY FASTENING CO., LTD., Osaka-shi (JP)

( * ) Notice: Subject to any disclaimer, the term of this patent is extended or adjusted under 35 U.S.C. 154(b) by 372 days.

(21) Appl. No.: 15/127,702

(22) PCT Filed: Feb. 25, 2015

(86) PCT No.: PCT/JP2015/055453
§ 371 (c)(1),
(2) Date: Sep. 20, 2016

(87) PCT Pub. No.: WO2015/141417
PCT Pub. Date: Sep. 24, 2015

(65) Prior Publication Data
US 2018/0201166 A1 Jul. 19, 2018

(30) Foreign Application Priority Data

Mar. 21, 2014 (JP) ................................. 2014-059330
Nov. 3, 2014 (JP) ................................. 2014-223862

(51) Int. Cl.
*B60N 2/58* (2006.01)
*A44B 18/00* (2006.01)
(Continued)

(52) U.S. Cl.
CPC ........ *B60N 2/5833* (2013.01); *A44B 18/0049* (2013.01); *A44B 18/0061* (2013.01);
(Continued)

(58) Field of Classification Search
CPC ............... B60N 2/5833; B60N 2/5883; A44B 18/0073; A44B 18/0061; A44B 18/0049;
(Continued)

(56) References Cited

U.S. PATENT DOCUMENTS 3,308,490 A * 3/1967 Cacioppo ............... A47C 31/10
297/DIG. 6
4,887,338 A 12/1989 Handler
(Continued)

FOREIGN PATENT DOCUMENTS

EP 1 661 477 A1 5/2006
EP 1 749 456 A1 2/2007
(Continued)

OTHER PUBLICATIONS

International Search Report dated May 26, 2015, in PCT/JP2015/055453 filed Feb. 25, 2015.
(Continued)

*Primary Examiner* — Milton Nelson, Jr.
(74) *Attorney, Agent, or Firm* — Oblon, McClelland, Maier & Neustadt, L.L.P.

(57) ABSTRACT

A surface fastener formed of a synthetic resin and in which a base with a 0.1 to 0.9 mm thickness and engagement element groups including engagement elements with a 0.2 to 0.8 mm protrusion height are integrally molded, and engagement element rows are composed of the plural engagement (Continued)

elements arranged in a row direction and each protruding independently. A cushioning member is covered with a covering member via the surface fastener. A resistance value of the surface fastener by itself as measured by a handle-o-meter method conforming to the JIS L 1096 E method is 80 to 150 g, whereas a load-deflection characteristic when a pressure is applied to an overlapping portion of the stacked surface fastener and cushioning member by a pressure plate with a 30 mm diameter approximates a similarly measured load-deflection characteristic of the cushioning member by itself.

16 Claims, 11 Drawing Sheets

(51) Int. Cl.
    *B29K 67/00*     (2006.01)
    *B29K 75/00*     (2006.01)
    *B29K 81/00*     (2006.01)
    *B29L 31/58*     (2006.01)
    *B29K 105/04*    (2006.01)
    *B29C 48/12*     (2019.01)

(52) U.S. Cl.
    CPC .......... *A44B 18/0073* (2013.01); *B29C 48/12* (2019.02); *B60N 2/5883* (2013.01); *B29K 2067/006* (2013.01); *B29K 2075/00* (2013.01); *B29K 2081/06* (2013.01); *B29K 2105/04* (2013.01); *B29L 2031/58* (2013.01)

(58) Field of Classification Search
    CPC ................. B29L 2031/58; B29C 48/12; B29K 2067/006; B29K 2081/06; B29K 2075/00; B29K 2105/04
See application file for complete search history.

(56) References Cited

U.S. PATENT DOCUMENTS

| | | | | |
|---|---|---|---|---|
| 5,007,676 | A * | 4/1991 | Lien | ................ B60N 2/5833 24/306 |
| 5,884,374 | A | 3/1999 | Clune | |
| 6,054,091 | A | 4/2000 | Miller et al. | |
| 6,463,634 | B1 | 10/2002 | Naohara et al. | |
| 6,524,507 | B1 | 2/2003 | Clune | |
| 7,077,473 | B2 * | 7/2006 | Demain | ................ B29C 33/12 297/218.2 |
| 2003/0127769 | A1 | 7/2003 | Clune | |
| 2005/0186385 | A1 | 8/2005 | Janzen et al. | |
| 2006/0110572 | A1 | 5/2006 | Herrero et al. | |
| 2006/0292329 | A1 | 12/2006 | Herrero et al. | |
| 2007/0022580 | A1 | 2/2007 | Ducauchuis | |
| 2007/0194611 | A1 | 8/2007 | Munoz Herrero et al. | |

FOREIGN PATENT DOCUMENTS

| | | |
|---|---|---|
| GB | 1 219 128 A | 1/1971 |
| JP | 5-7672 A | 1/1993 |
| JP | 7-124004 A | 5/1995 |
| JP | 2000-262306 A | 9/2000 |
| JP | 2011-24864 A | 2/2011 |
| JP | 2011-182910 A | 9/2011 |
| JP | 2013-123438 A | 6/2013 |
| WO | WO 98/14086 A1 | 4/1998 |

OTHER PUBLICATIONS

Extended European Search Report dated Feb. 7, 2018 in Patent Application No. 15764522.7.

* cited by examiner

Fig. 8

| | RESIN | BASE THICKNESS | WHOLE WIDTH | RIGIDITY IN LENGTH DIRECTION OF FASTENER | | | | | | HANDLE-O-METER (g) | | RIGIDITY IN WIDTH DIRECTION OF FASTENER | |
|---|---|---|---|---|---|---|---|---|---|---|---|---|---|
| | | | | CANTILEVER (mm) | | HEART LOOP (mm) | | | | | | | |
| | | | | HOOK FACING UPWARD | HOOK FACING DOWNWARD | HOOK FACING UPWARD | HOOK FACING OUTWARD | HOOK FACING UPWARD | HOOK FACING DOWNWARD | HOOK FACING UPWARD | HOOK FACING DOWNWARD |
| EXAMPLE 1 | STANDARD PES | 0.32 | 30 | 105 | 150< | 32 | 33 | 141 | 135 | 87 | 126 |
| | | | | 90 | 150< | 32 | 32 | 111 | 129 | 104 | 112 |
| | | | | 102 | 150< | 32 | 33 | 105 | 131 | 105 | 121 |
| | | | AVE. | 99 | 150< | 32 | 33 | 119 | 132 | 99 | 120 |
| | | | TTL | 99 (DATA OF HOOK FACING UPWARD) | | 32 | | | 125 | | 109 |
| COMPARATIVE EXAMPLE 1 | Base:NY Hook:PP | – | 30 | 150< | 95 | 33 | 33 | 42 | 36 | 29 | 34 |
| | | | | 150< | 97 | 31 | 34 | 48 | 50 | 35 | 35 |
| | | | | 150< | 98 | 35 | 35 | 40 | 60 | 27 | 40 |
| | | | AVE. | 150< | 97 | 33 | 34 | 43 | 49 | 30 | 36 |
| | | | TTL | 97 (DATA OF HOOK FACING DOWNWARD) | | | 34 | | 46 | | 33 |
| REMARKS | | | | CONFORMING TO JIS L1096 A METHOD  FASTENER LENGTH 150 mm | | CONFORMING TO JIS L1096 D METHOD  FASTENER LENGTH 250 mm (EFFECTIVE LENGTH 200 mm) MEASURED ONE MINUTE AFTER FIXATION WITH JIG | | CONFORMING TO JIS L1096 E METHOD  PLATE WIDTH 30 mm | | PLATE WIDTH 16 mm FASTENER LENGTH 20 mm  VALUE OF RESISTANCE (g) ENCOUNTERED BY BLADE IS MEASURED WHEN BLADE IS MOVED DOWN BY 8 mm FROM SURFACE OF TEST STAND | |

(a)

(b)

| PART NUMBER | NONWOVEN FABRIC A | | NONWOVEN FABRIC B | |
|---|---|---|---|---|
| WEIGHT (g/m2) | 195 | | 130 (125±13) | |
| THICKNESS (mm) | 1.70 | | 1.35 | |
| | FLOW DIRECTION | WIDTH DIRECTION | FLOW DIRECTION | WIDTH DIRECTION |
| SHEAR STRENGTH (N/cm2) | 12.8 | 11.7 | 8.5 | 8.7 |
| | 14.3 | 12.0 | 7.6 | 7.9 |
| | 12.9 | 10.5 | 8.5 | 7.5 |
| | 13.3 | 10.6 | 9.1 | 8.7 |
| | 13.2 | 12.2 | 7.9 | 7.9 |
| | 13.2 | 12.9 | 8.8 | 8.3 |
| AVE. | 13.3 | 11.7 | 8.4 | 8.2 |
| 45° PEEL STRENGTH (N/cm2) | 6.7 | 5.4 | | |
| | 6.3 | 5.9 | | |
| | 6.1 | 6.0 | | |
| | 6.9 | 5.6 | | |
| | 6.3 | 6.5 | | |
| | 5.8 | 6.7 | | |
| AVE. | 6.4 | 5.9 | — | — |
| 5° PEEL STRENGTH (N/cm2) | 13.4 | 13.5 | | |
| | 12.8 | 13.2 | | |
| | 13.1 | 12.2 | | |
| AVE. | 13.1 | 13.0 | — | — |
| 10° PEEL STRENGTH (N/cm2) | 12.5 | 11.8 | | |
| | 10.2 | 11.3 | | |
| | 11.2 | 10.3 | | |
| AVE. | 11.3 | 11.1 | — | — |
| PEEL STRENGTH (N/cm) | 2.7 | 2.7 | 2.0 | 2.7 |
| | 2.9 | 2.7 | 2.3 | 1.8 |
| | 2.6 | 2.6 | 2.3 | 2.1 |
| | 3.1 | 2.8 | 2.0 | 2.0 |
| | 3.2 | 3.0 | 1.9 | 2.0 |
| | 2.9 | 3.2 | 1.9 | 2.5 |
| AVE. | 2.9 | 2.8 | 2.1 | 2.2 |
| PERPENDICULAR STRENGTH (N/cm2) | 2.3 | 3.3 | 1.7 | 3.2 |
| | 2.4 | 2.7 | 2.2 | 2.2 |
| | 2.5 | 2.1 | 2.0 | 2.0 |
| | 2.7 | 2.2 | 3.4 | 2.5 |
| | 3.2 | 2.9 | 2.0 | 2.1 |
| | 3.6 | 3.0 | 2.4 | 2.0 |
| AVE. | 2.8 | 2.7 | 2.3 | 2.3 |

※ ABOVE NUMERICAL VALUES ARE ACTUAL MEASUREMENT VALUES

SURFACE FASTENER, CUSHIONING STRUCTURE, AND SEAT STRUCTURE

TECHNICAL FIELD

The present invention relates to a surface fastener, a cushioning structure covered with a covering member via the surface fastener, and a seat structure using the cushioning structure.

BACKGROUND ART

As is disclosed in Patent Document 1, a hook surface fastener has protruding engagement elements in a hook shape, a mushroom shape, or an arrowhead shape formed to protrude on a base. The protruding engagement elements are ordinarily formed to stand substantially vertically from the base. Accordingly, in an engaged state with an engagement counterpart (loop surface fastener, or the like), the surface fastener exhibits a certain engagement force against tensile forces both in a shear direction (direction horizontal to the surface) and the vertical direction.

Patent Document 2 and Patent Document 3 each disclose a surface fastener including protruding engagement elements tilting in one direction on a base to thereby have an engagement force that differs depending on a tensile direction. This increases the engagement force in a specific direction.

PRIOR ART DOCUMENT

Patent Document

Patent Document 1: Japanese Patent Application Laid-open No. 2013-123438

Patent Document 2: Japanese Patent Application Laid-open No. 2011-24864

Patent Document 3: Japanese Patent Application Laid-open No. Hei 7-124004

DISCLOSURE OF THE INVENTION

Problems to Be Solved by the Invention

A shear-direction engagement force of a surface fastener greatly depends on surface-direction elasticity of the aforesaid protruding engagement elements, and the protruding engagement elements standing substantially vertically as in Patent Document 1 need to be designed to have such elasticity that a predetermined engagement force works in a balanced manner in all the surface directions. If they are designed so that the engagement force works in a balanced manner in all the directions, it becomes difficult to set the engagement force extremely high. In Patent Documents 2, 3, a high engagement force can work only in a specific direction.

In many cases, an outer layer member covering a cushioning member of a seat for vehicles such as automobiles is fixed to the cushioning member or the like via a surface fastener. Desirably, the surface fastener used here gives as little feeling of something foreign as possible to a seated person. In addition, the surface fastener desirably has a higher engagement force, especially a higher engagement force in a shear direction, so as not to be disengaged when the seated person moves.

The present invention was made in consideration of the above and its object is to provide a surface fastener that does not give a person a feeling of something foreign and can preferably have a higher engagement force especially in a shear direction than conventionally when used as a joining means for a covering member covering a cushioning member, and that is suitable as a joining means used when a cushioning member is covered with a covering member in a cushioning structure to which a predetermined load is applied, preferably in a cushioning structure provided in a seat structure, and to provide a cushioning structure including the surface fastener and a seat structure using the cushioning structure.

Means for Solving the Problems

To solve the aforesaid problems, a surface fastener of the present invention is a surface fastener which is used while stacked on a cushioning member to fix a covering member to the cushioning member that is to be covered, the surface fastener being formed of a synthetic resin and including integrally molded base with a 0.1 to 0.9 mm thickness and engagement element group including at least one engagement element row composed of a plurality of protruding engagement elements with a 0.2 to 0.8 mm protrusion height arranged in a row on one surface of the base, wherein a resistance value of the surface fastener as measured by a handle-o-meter method conforming to the JIS L 1096 E method is within an 80 to 150 g range, and wherein, when a load value is 40 N or more, a hysteretic characteristic of a load-deflection graph which is obtained when a pressure up to 100 N is applied to a stack of the surface fastener and the cushioning member by a pressure plate with a 30 mm diameter is within a ±5% range of a hysteretic characteristic of a load-deflection graph which is obtained when the pressure is applied only to the cushioning member under the same condition, and a spring constant of the surface fastener by itself is 0.5 N/mm or less.

Preferably, in the surface fastener of the present invention, the base coupled to a predetermined position of a joining counterpart has a portion contributing to the occurrence of a bending point. More preferably, the base has a portion where a modulus of section sharply changes by a 5 to 50% range, and the portion is the portion contributing to the occurrence of a bending point. More preferably, the base is coupled to the predetermined position of the joining counterpart by sewing and due to perforations formed by the sewing, the base has a portion where the modulus of section is in a 50 to 95% range of a modulus of section before the sewing, and the portion is the portion where the modulus of section sharply changes. Preferably, the synthetic resin is a polyester elastomer (PES) resin.

Preferably, in the surface fastener of the present invention, the engagement elements include tilting engagement elements standing obliquely from the base, the surface fastener including a tilting engagement element group as the engagement element group, including at least one tilting engagement element row as the engagement element row, composed of the plural tilting engagement elements arranged in a row.

Preferably, in the surface fastener of the present invention, the engagement elements include vertical engagement elements standing substantially vertically from the base, the surface fastener including a vertical engagement element group as the engagement element group, including at least one vertical engagement element row as the engagement element row, composed of the plural vertical engagement elements arranged in a row, and the engagement elements include tilting engagement elements standing obliquely from the base, the surface fastener including a tilting engagement element group as the engagement element group, including at least one tilting engagement element row as the engagement element row, composed of the plural tilting engagement elements arranged in a row.

Preferably, the tilting engagement element group includes a first tilting engagement element group and a second tilting engagement element group each including at least one row of the tilting engagement element row, and first tilting engagement elements belonging to the first tilting engagement element group and second tilting engagement elements belonging to the second tilting engagement element group tilt in directions opposite to each other. Preferably, a boundary portion between the first tilting engagement element group and the second tilting engagement element group is an elementless portion not having the tilting engagement element, and the elementless portion is coupled to the predetermined position of the joining counterpart.

A cushioning structure of the present invention is a cushioning structure in which a cushioning member is covered with a covering member, the cushioning structure including any one of the above-described surface fasteners which is coupled to a predetermined position of the covering member and via which the cushioning member is covered with the covering member.

Preferably, the surface fastener is located on a surface opposite to a load support surface of the cushioning member, and tension generated when a load is applied to the cushioning member causes the tilting engagement elements to further tilt in such a direction as to have increased engagement forces with an engagement counterpart. Preferably, the elementless portion of the surface fastener is located on the surface opposite to the load support surface of the cushioning member, and when the load is applied to the cushioning member, the elementless portion deflects in a pressing direction of the applied load and the first tilting engagement elements belonging to the first tilting engagement element group and the second tilting engagement elements belonging to the second tilting engagement element group, which tilting engagement elements tilt in the opposite directions, further tilt in such directions as to have increased engagement forces with the engagement counterpart.

A seat structure of the present invention is a seat structure in which a cushioning structure is disposed in a seat cushion part or a seat back part, the seat structure including the above-described cushioning structure. Preferably, an outer layer member is used as the covering member included in the cushioning structure, and the cushioning member is covered with the outer layer member via the surface fastener.

Effect of the Invention

In the present invention, as the surface fastener, used is one which is formed of the synthetic resin and in which the base having a predetermined thickness and the engagement element group including the engagement elements with a predetermined protrusion height are integrally formed, and the engagement element rows are each composed of the plural engagement elements arranged in a row and each independently protruding. The cushioning member is covered with the covering member via the surface fastener. The resistance value of the surface fastener by itself as measured by the handle-o-meter method conforming to the JIS L 1096 E method is 80 to 150 g and thus higher than resistance values of ordinary surface fasteners formed of a woven fabric. On the other hand, the static load characteristic obtained from the load-deflection graph when the pressure is applied by the pressure plate with a 30 mm diameter to a portion where the stacked surface fastener and cushioning member overlap with each other approximates the static load characteristic of the similarly measured load-deflection graph of the cushioning member by itself. Further, the spring constant of the surface fastener by itself is set to 0.5 N/mm or less.

The resistance value measured by the handle-o-meter method being higher than those of ordinary surface fasteners formed of a woven fabric means that surface rigidity of the surface fastener of the present invention by itself is high, but the static load characteristic when the surface fastener is stacked on the cushioning member approximates the static load characteristic when the surface fastener is not stacked thereon. Accordingly, the presence of the surface fastener is not likely to give a feeling of something foreign. This is because, due to the high surface rigidity of the surface fastener by itself, the surface fastener locally deforms only a little and has high body pressure dispersibility. Further, since the spring constant of the surface fastener by itself is equal to or less than 0.2 to 1 N/mm which is a spring constant of the muscle of the buttocks of a person, the surface fastener is not likely to give a feeling of something foreign. Therefore, the surface fastener of the present invention is suitable for joining a covering member of a cushioning member which is given a load due to its contact with a person as in a vehicle seat.

Further, the base coupled to the predetermined position of the joining counterpart has the portion contributing to the occurrence of a bending point, or preferably the base has the portion where the modulus of section sharply changes by a 5 to 50% range, or more preferably, the base of the surface fastener is coupled to the predetermined position of the joining counterpart by the sewing and due to the perforations formed by the sewing, the base has the portion where the modulus of section is within a 50 to 90% range of the modulus of section before the sewing. This easily causes the bending along a portion with a low modulus of section (especially the perforation portion) when a load is applied, to increase engagement forces of the engagement elements with the engagement counterpart. As the engagement element group, the surface fastener preferably includes the tilting engagement element group composed of the tilting engagement elements. Further, the surface fastener preferably includes the first tilting engagement element group and the second tilting engagement element group which include the engagement elements tilting in the opposite directions. This can more increase the engagement force in a shear direction.

Therefore, when the cushioning member covered with the outer layer member via this surface fastener is used in the cushioning structure included in the seat structure, and preferably, when the surface fastener is disposed so that the boundary portion between the first tilting engagement element group and the second tilting engagement element group, which portion is an easily bending portion of the surface fastener, serves as a fulcrum of a force of the applied load, the shear direction engagement force in the surface fastener is increased, so that the outer layer member does not easily come off the cushioning member.

BRIEF DESCRIPTION OF DRAWINGS

FIG. 1(c) is a cross-sectional view taken along the A-A line in (a) in a loaded state where a load is applied to the seat cushion.

FIG. 8 is a chart showing results of rigidity tests.

DESCRIPTION OF EMBODIMENTS

Figure 1:
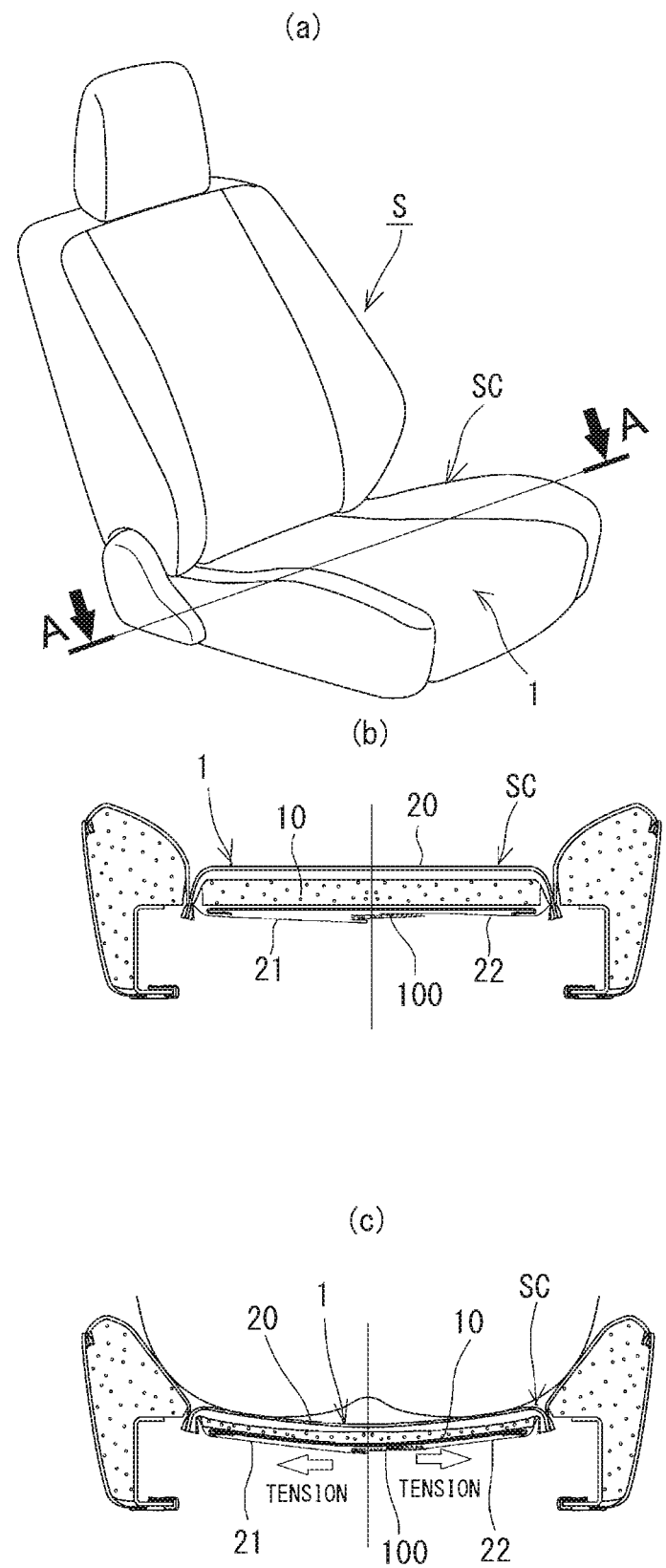
FIG. 1(*a*) is a perspective view of an automobile seat covered with an outer layer member which is fixed using a surface fastener according to one embodiment of the present invention, FIG. 1(*b*) is a cross-sectional view taken along the A-A line in (a) in a load-free state where no load is applied to a seat cushion.

The present invention will be hereinafter described in more detail based on embodiments illustrated in the drawings. FIG. 1 illustrate the external structure of an automobile seat S using a cushioning structure 1 according to one embodiment of the present invention. In this embodiment, the cushioning structure 1 is used in a seat cushion part SC of the automobile seat S. In the cushioning structure 1, a cushioning member 10 is covered with an outer layer member 20 as a covering member via a surface fastener 100.

The cushioning member 10 is formed of, for example, a polyurethane foam, has a predetermined size and a predetermined thickness, and is supported by a frame of the seat cushion part SC. The outer layer member 20 is formed of genuine leather, synthetic leather, fabric, or the like, and covers the cushioning member 10 via the surface fastener 100.

Figure 2:
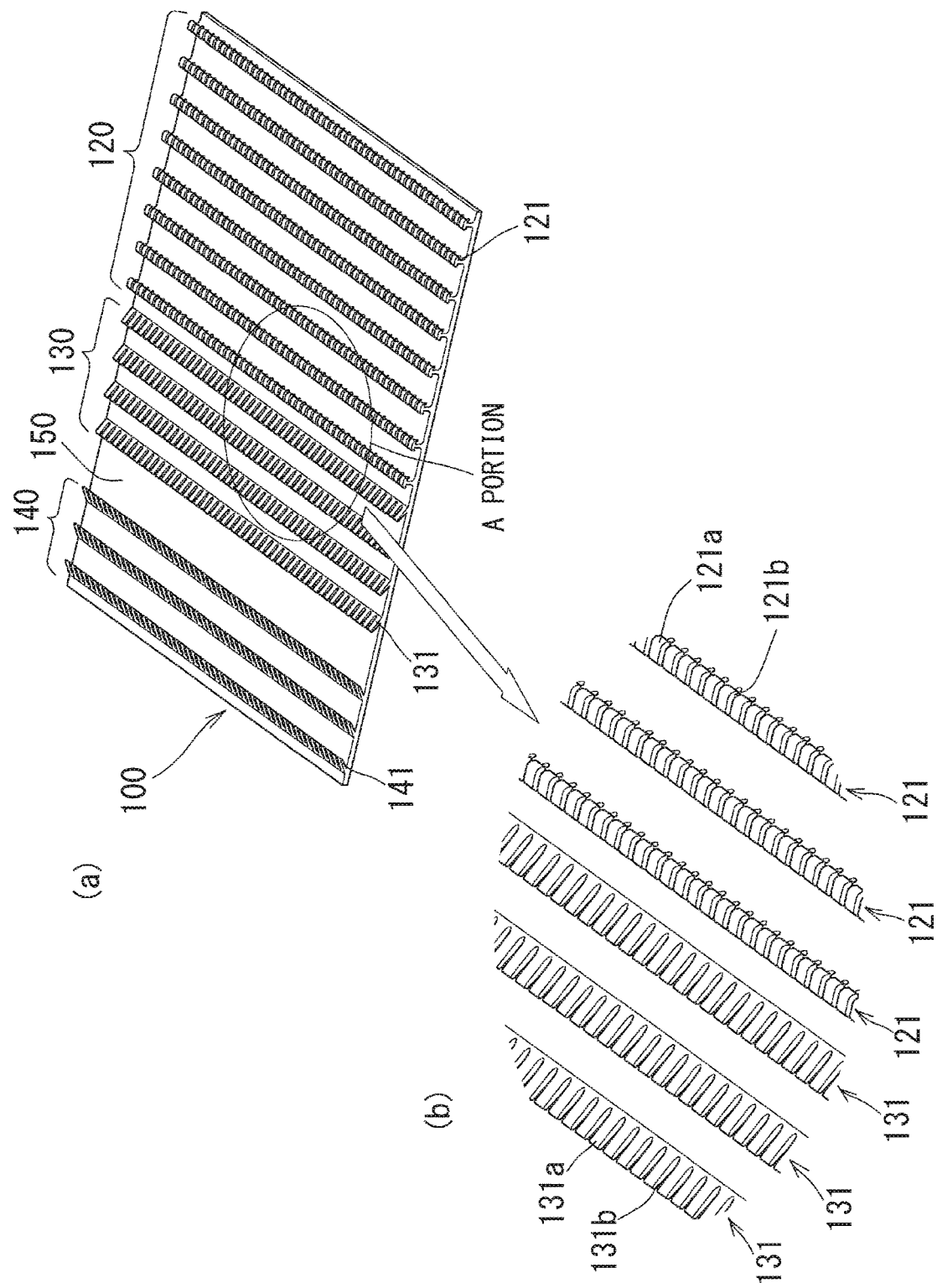
FIG. 2(a) is a perspective view illustrating the surface fastener according to the embodiment.
FIG. 2(b) is an enlarged view of the A portion in (a).
Figure 3:
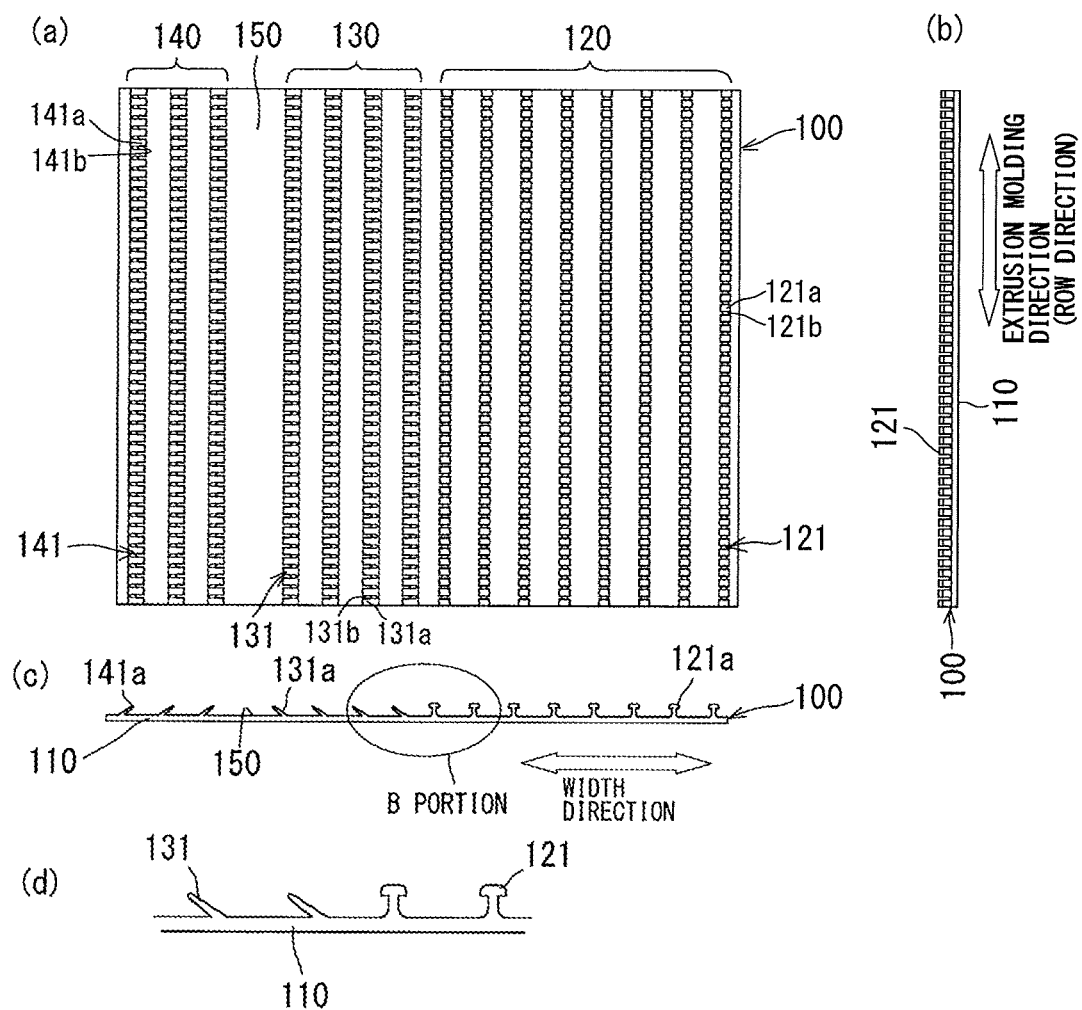
FIG. 3(a) is a plane view of the surface fastener illustrated in FIG. 2.
FIG. 3(b) is a side view of (a)
FIG. 3(c) is an end view of (a)
FIG. 3(d) is an enlarged view of the B portion in (c).
Figure 4:
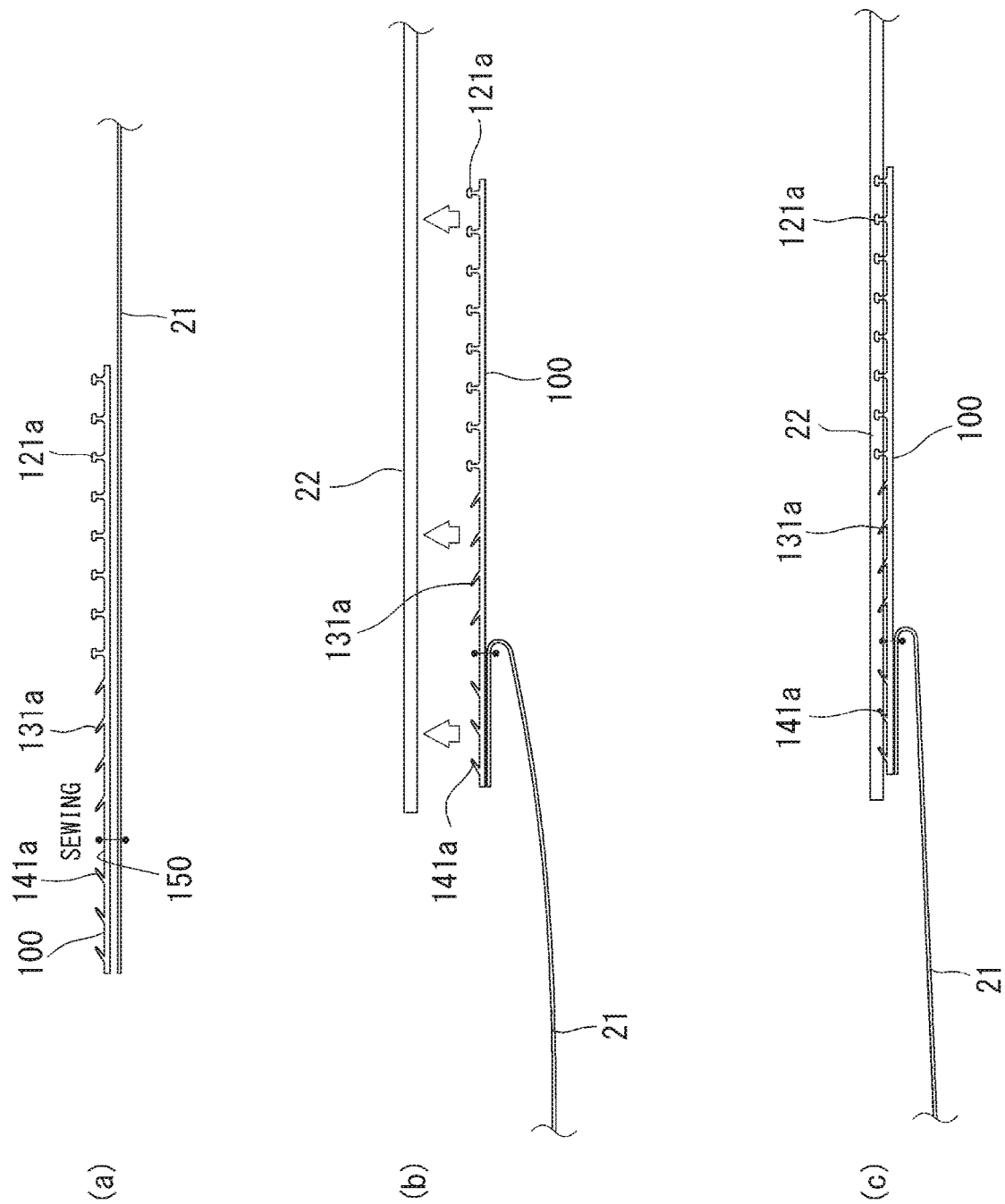
FIGS. 4(a) to (c) are views illustrating a process of attaching the surface fastener according to the embodiment to a drawing fabric and thereafter joining the surface fastener to an engagement counterpart.

As illustrated in FIG. 2 and FIG. 3, in the surface fastener 100, a vertical engagement element group 120, a first tilting engagement element group 130, and a second tilting engagement element group 140 are provided on a base 110. The base 110 and the engagement element groups 120 to 140 of the surface fastener 100 are integrally formed by extrusion molding using a thermoplastic resin as a synthetic resin material. Specifically, the synthetic resin material is extruded from an extrusion nozzle (not illustrated) having a slit having a shape corresponding to the end face shape (same as a section shape) of the base 110 and the engagement element groups 120 to 140 as illustrated in FIG. 3(c), so that they are integrally molded.

The surface fastener 100 of this embodiment is molded very thin and is used in the seat cushion part SC which is a part constantly given a load of a person. Accordingly, the synthetic resin is preferably a thermoplastic elastomer, more preferably, a polyester elastomer (PES) because they have high strength and are excellent in dimensional stability, impact resistance, heat resistance, and so on even if they are thin. The synthetic resin is still more preferably a resin formed of a block copolymer composed of a polybutylene terephthalate block as a hard segment and a polyether block as a soft segment. The base 110 has a thin plate shape with a 0.1 to 0.9 mm thickness and has the engagement element groups 120 to 140 formed on its one surface. In this embodiment, as illustrated in FIG. 2 and FIG. 3, the eight rows on the right in the drawing belong to the vertical engagement element group 120, the four rows on the left of the vertical engagement element group 120 belong to the first tilting engagement element group 130, and the three rows on the further left belong to the second tilting engagement element group 140. Note that the number of rows and so on of each of the engagement element groups 120 to 140 may of course be any. The arrangement order of the engagement element groups 120 to 140 is not limited to that illustrated in the drawings, either.

The vertical engagement element group 120 includes eight vertical engagement element rows 121 having many vertical engagement elements 121a arranged along the row direction and having a substantially mushroom shape whose upper portions protrude leftward and rightward when seen from the end face as illustrated in FIG. 3(d). The vertical engagement elements 121a each have, for example, a 0.2 to 0.8 mm height from the surface of the base 110. As described above, the PES resin has high strength and excellent dimensional stability and do not easily collapse despite its small height, and thus can exhibit a predetermined engagement force with a joining counterpart.

The first tilting engagement element group 130 includes four first tilting engagement element rows 131 having many first tilting engagement elements 131a arranged along the row direction and standing from the surface of the base 110 so as to tilt leftward in the drawings, that is, toward the second tilting engagement element group 140 as illustrated in FIGS. 3(c), (d). A tilt angle of the first tilting engagement elements 131a may be any, but is preferably within a range of 30 to 80 degrees, considering easiness of the engagement with the joining counterpart. Further, the first tilting engagement elements 131a each preferably have a 0.2 to 0.8 mm vertical-direction height from the surface of the base 110 similarly to the vertical engagement elements 121a.

The second tilting engagement element group 140 includes three second tilting engagement element rows 141 having many second tilting engagement elements 141a arranged along the row direction and standing from the surface of the base 110 so as to tilt rightward in the drawings, that is, toward the first tilting engagement element group 130 as illustrated in FIGS. 3(c), (d). Note that a preferable tilt angle and a preferable vertical-direction height of the second tilting engagement elements 141a are the same as those of the first tilting engagement elements 131a.

The vertical engagement elements 121a, the first tilting engagement elements 131a, and the second tilting engagement elements 141a are all formed in a large number in the row direction here, and between the engagement elements adjacent in the row direction, gaps 121b, 131b, 141b each being an independent element are formed. Consequently, the whole surface fastener 100 can have flexibility along the row direction.

The number of the vertical engagement element rows 121 included in the vertical engagement element group 120, the number of the first tilting engagement element rows 131 included in the first tilting engagement element group 130, and the number of the second tilting engagement element rows 141 included in the second tilting engagement element group 140, and the intervals between these rows may be any as described above, and are determined appropriately in consideration of a required engagement force and other factors. In this embodiment, however, as illustrated in FIG. 3, the intervals between the adjacent rows in a region from the right end vertical engagement element row 121 up to the left end first tilting engagement element row 131 are all equal, and the intervals of the three second tilting engagement element rows 141 are also equal, but an interval between the left end first tilting engagement element row 131 and the right end second tilting engagement element row 141 is wider than the other intervals between the rows. That is, a range between the left end first tilting engagement element row 131 and the right end second tilting engagement element row 141, where the surface of the base 110 is exposed, is an elementless portion 150 having no engagement element.

In the surface fastener 100 as structured above, the elementless portion 150 is coupled to a predetermined position of a joining counterpart, in this embodiment, coupled to a predetermined position of the outer layer member 20 which is a covering member covering the cushioning member 10. More specifically, in this embodiment, a first and a second drawing fabric 21, 22 are attached to edges of the outer layer member 20 in order to draw the outer layer member 20 from both sides of the seat frame to a rear surface side of the cushioning member 10 to draw it in the center direction of the rear surface side of the cushioning member 10. The first drawing fabric 21 is stacked on the rear surface of the base 110 of the surface fastener 100 and an end portion of the first drawing fabric 21 is coupled to a position of the elementless portion 150 by sewing.

The engagement element groups 120 to 140 located on the front surface side of the base 110 are joined to an engagement counterpart. The engagement counterpart mentioned here refers to a mate part with which the engagement elements 121a to 141a forming the engagement element rows 121 to 141 of the engagement element groups 120 to 140 are engaged, and may be a loop surface fastener making a pair with the hook surface fastener of this embodiment including the engagement elements 121a to 141a or may be a nonwoven fabric having no special loop. In this embodiment, the second drawing fabric 22 drawn to the rear surface side of the cushioning member 10 is formed of a nonwoven fabric and works as the engagement counterpart, and the engagement elements 121a to 141a forming the engagement element rows 121 to 141 of the engagement element groups 120 to 140 of the surface fastener 100 are engaged with the second drawing fabric 22.

Figure 6:
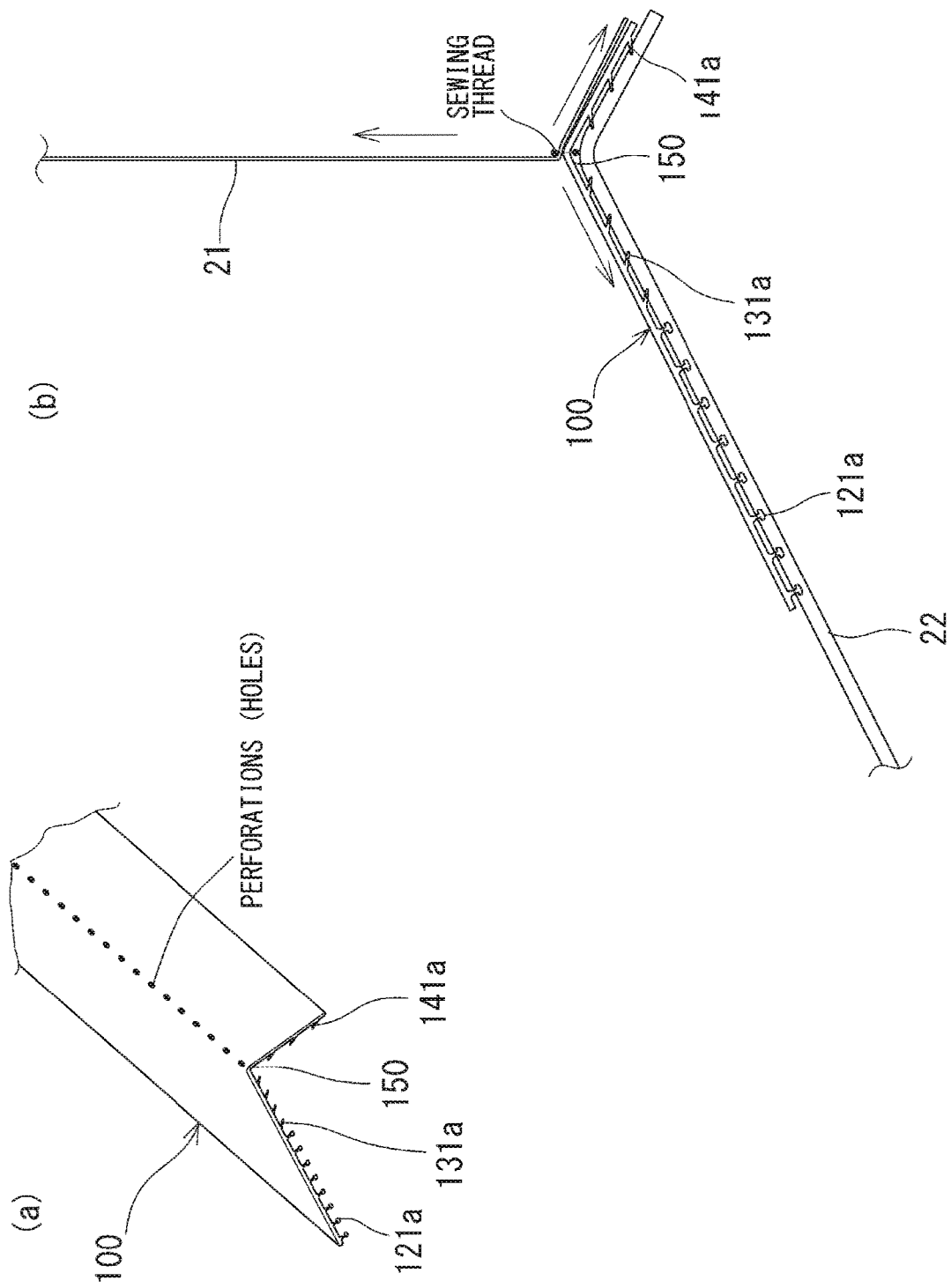
FIGS. 6(a), (b) are explanatory views of the operation of sewing perforations of the surface fastener according to the embodiment.

For the coupling of the surface fastener 100 and the first drawing fabric 21 here, a sewing means is preferably used. As illustrated in FIGS. 6(a), (b), perforations (holes) are formed as a result of the sewing. Due to the perforations (holes), a modulus of section in this portion reduces. Because of the reduced modulus of section, the surface fastener 100 easily bends along the perforations (holes) of the elementless portion 150 which is the portion coupled by the sewing. Accordingly, when the first drawing fabric 21 is pulled, the surface fastener 100 surely bends along the perforations (holes) of the elementless portion 150. As a result, the first tilting engagement elements 131a belonging to the first engagement element group 130 which tilt in one direction and the second tilting engagement elements 141a belonging to the second tilting engagement element group 140 which tilt in the opposite direction penetrate in the second drawing fabric 22, so that their engagement forces more increase.

Figure 7:
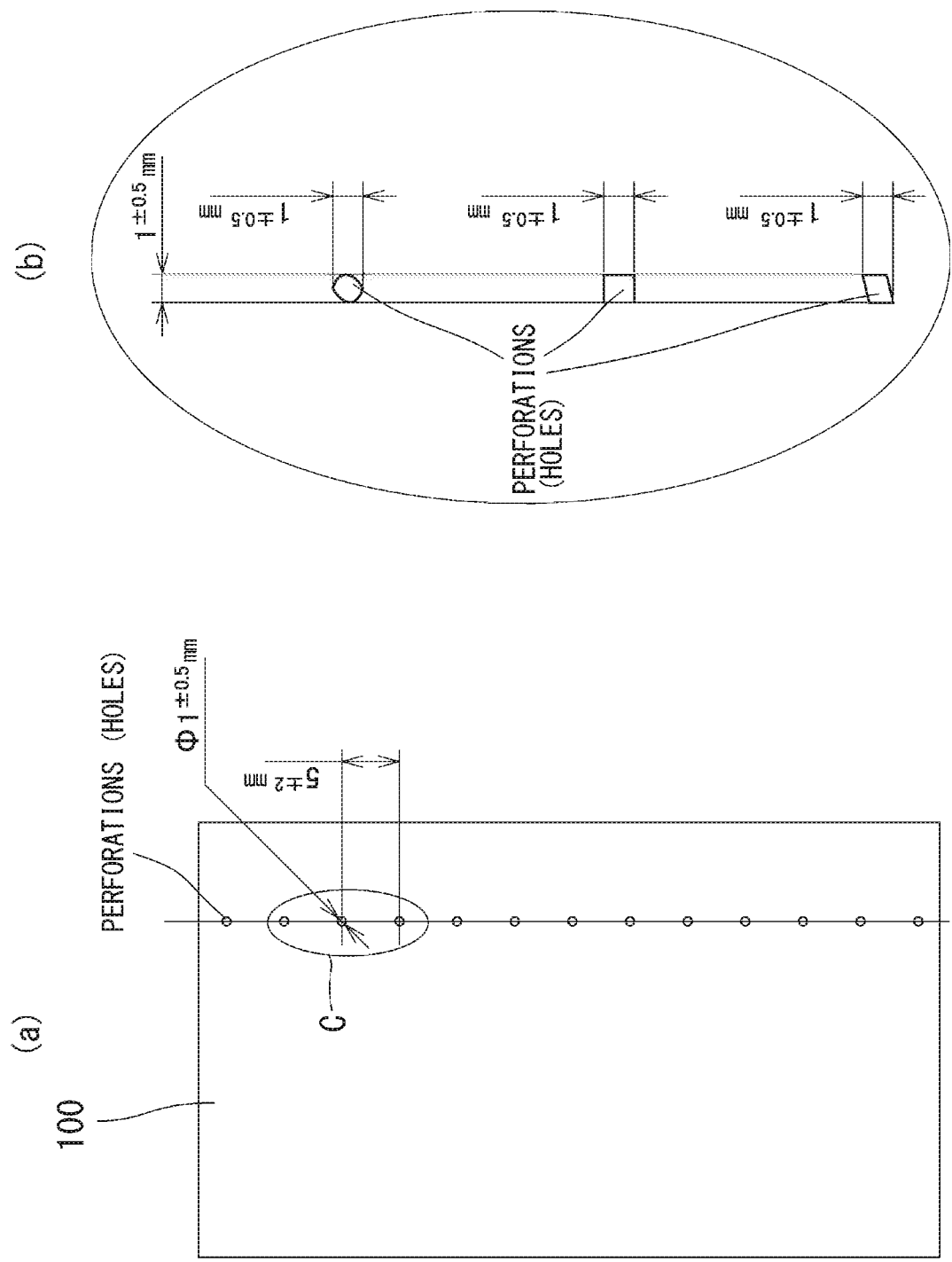
FIG. 7(a) is a view illustrating an example of the size (diameter) of the perforations and intervals between the perforations.
FIG. 7(b) is an enlarged view of the C portion in (a).

The modulus of section is preferably within a range of 50 to 95%, more preferably within a range of 70 to 90%, of that before the sewing, with respect to 100 being a modulus of section of a range which is along the line of the perforations (holes) and is surrounded by the width (diameter) of the perforations (holes) and the length of the surface fastener 100 along the line of the perforations (holes), as illustrated in FIG. 7. Too low a modulus of section results in an excessive decrease of strength when the elementless portion 150 is pulled, and too high a modulus of section results in a decreased operation of the bending along the perforations (holes). Assuming that the perforations (holes) are each, for example, 1 mm+0.5, the modulus of section is 50 to 83% of that before the sewing when the sewing pitch is 3 mm, the modulus of section is 70 to 90% of that before the sewing when the sewing pitch is 5 mm, and the modulus of section is 78.6 to 92.9% of that before the sewing when the sewing pitch is 7 mm.

The use of the sewing means is preferable because it can simultaneously and easily achieve a means for coupling the surface fastener 100 and the first drawing fabric 21 and a means for forming the easily bending part by decreasing the modulus of section. Alternatively, the means for forming the easily bending part in the elementless portion 150 can be, for example, a means which molds the elementless portion 150 into a shape with a small modulus of section in advance, or a means which joins the first drawing fabric 21 and the elementless portion 150 by vibration welding or the like and at this time works the elementless portion 150 into a thin shape.

Figure 5:
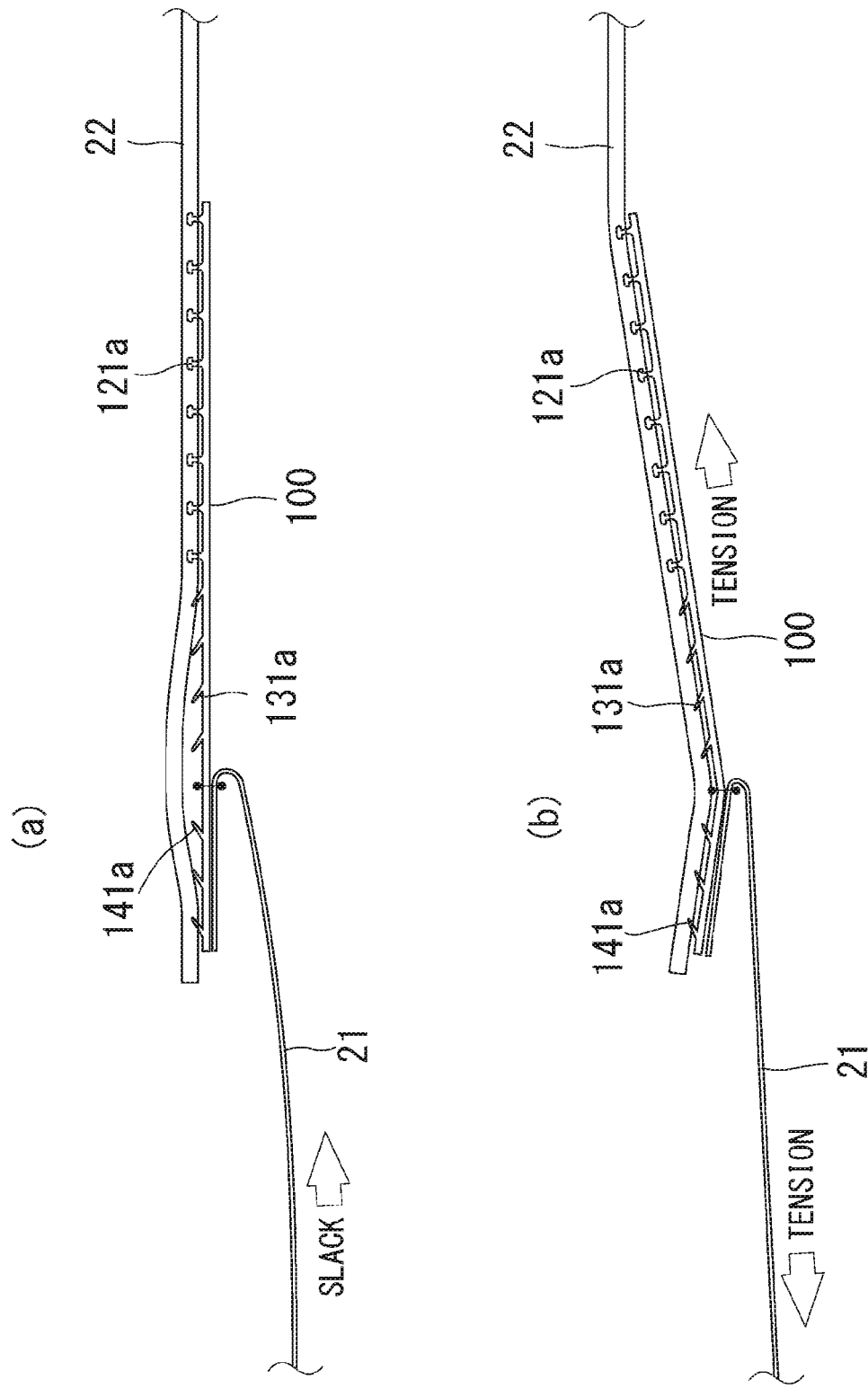
FIGS. 5(a), (b) are explanatory views of the operation of the surface fastener according to the embodiment.

According to this embodiment, owing to the above-described structure, when a person is seated in the cushioning structure 1 included in the seat cushion part SC, the cushioning member 10 sinks and as illustrated in FIG. 1(c), tensions act in directions so that the first and second drawing fabrics 21, 22 drawn to the rear side from the both sides of the outer layer member 20 are pulled outward from the center. As illustrated in FIG. 5(a) and FIG. 5(b), the action of the tensions deflects the elementless portion 150, which is the coupling position with the first drawing fabric 21, in a downward direction which is a pressing direction of a load of the person. As a result, the first tilting engagement elements 131a of the first tilting engagement element rows 131 belonging to the first tilting engagement element group 130 and the second tilting engagement elements 141a of the second tilting engagement element rows 141 belonging to the second tilting engagement element group 140, which tilting engagement elements face each other across the elementless portion 150 and tilt in the opposite directions, further penetrate in the second drawing fabric 22 to have increased engagement forces. That is, even if forces act in the shear direction on the first and second drawing fabrics 21, 22 when a person is seated, the tilting engagement elements 131a, 141a further penetrate to have increased engagement forces in the shear direction.

The tilting engagement elements 131a, 141a thus penetrate so as to have the increased engagement forces when the tensions act on the elementless portion 150 which is the coupling portion. Therefore, the first tilting engagement element row 131 (first tilting engagement element group 130) having the first tilting engagement elements 131a and the second tilting engagement element row 141 (second tilting engagement element group 140) having the second tilting engagement elements 141a are essential. On the other hand, engagement forces of the vertical engagement element row 121 (vertical engagement element group 120) having the vertical engagement elements 121a are increased only slightly by the tensions, but they have engagement forces acting in all the shear directions and thus are preferably provided as in this embodiment.

Further, in the surface fastener 100 of this embodiment, the base 110 has a 0.1 to 0.9 mm thickness and the engagement elements 121a to 141a each have a 0.2 to 0.8 mm height from the surface of the base 110 as described above. In FIG. 1, since the surface fastener 100 is disposed on the rear surface side of the cushioning member 10, a person basically does not feel the presence of the surface fastener 100 when seated, but if the surface fastener 100 is disposed on the front surface side of the cushioning member 10 and the outer layer member 20 is joined therewith, the person may feel the presence of the surface fastener 100 when seated. In this embodiment, on the other hand, the base 110 is thin and the engagement elements 121a to 141a each have a low protrusion height as described above, and accordingly the whole thickness of the surface fastener 100 is also within a range of 0.3 to 1.7 mm, preferably within a range of 0.5 to 1.2 mm. Even if the surface fastener 100, which is thus very thin, is disposed on the front surface side of the cushioning member 10 and joined with the outer layer member 20, a seated person scarcely feels the presence of the surface fastener 100.

Further, to prevent the seated person from feeling the presence of the surface fastener 100, the surface fastener 100 needs to have high follow-up ability to the cushioning member 10 in addition to satisfying the above thickness requirement. The surface fastener 100 gives a less feeling of something foreign by deforming similarly to the cushioning member 10. On the other hand, in a case where the surface fastener 100 is used to, for example, fix a covering member of an automobile seat on which a large peeling force acts in the shear direction when a person is seated therein, the engagement elements 121a to 141a of the surface fastener 100 need to have high engagement forces in the shear direction. Accordingly, to achieve both the high follow-up ability to the cushioning member 10 and the high engagement forces (in particular, the engagement forces in the shear direction (surface direction)) of the engagement elements 121a to 141a, the surface fastener 100 is required to maintain predetermined surface rigidity in an independent state, and not to locally deform in the state of being stacked on the cushioning member 10, and preferably has the following properties in addition to the aforesaid thickness condition and the aforesaid condition of the used synthetic resin material (preferably, the PES resin).

Firstly, the surface fastener 100 is fabricated so that a resistance value of the surface fastener 100 by itself as measured by a handle-o-meter method conforming to the JIS L 1096 E method falls within a range of 80 to 150 g. With the resistance value falling within this range, the surface fastener 100 can have predetermined surface rigidity, and the engagement elements 121a to 141a do not collapse and can have high engagement forces even if the peeling force in the surface direction is applied. Further, in the stacked state on the cushioning member 10, the surface fastener 100 is less likely to undergo large partial deformation due to a concentrated load, deforms along the deformation of the cushioning member 10, and thus gives no feeling of something foreign.

(Rigidity Tests)

Rigidity was compared among the surface fastener 100 according to this embodiment (example 1), a surface fastener formed of a woven fabric (comparative example 1), and the nonwoven fabric forming the second drawing fabric 22 adopted in this embodiment as the engagement counterpart joined to the surface fastener 100 (comparative example 2).

(Structure of Test Samples)

The surface fastener 100 of the example 1 was fabricated by extrusion molding of a standard PES resin. Its structure is as illustrated in FIG. 2 and FIG. 3. It has the eight vertical engagement element rows 121, the four first tilting engagement element rows 131, the three second tilting engagement element rows 141, and the elementless portion 150 formed between the first tilting engagement element rows 131 and the second tilting engagement element rows 141. The element rows 121 to 141 each had a 30 mm width in a perpendicular direction to the rows, the base 110 had a 0.32 mm thickness, the vertical engagement elements 121a each had a 0.62 mm protrusion height (vertical height) from the base 110, and the first tilting engagement elements 131a and the second tilting engagement elements 141a each had a 0.51 mm protrusion height (vertical height) from the base 110.

The surface fastener of the comparative example 1 was as follows:

woven fabric surface fastener manufactured by Kuraray Fastening Co., Ltd.
brand name "MAGITOUCH" (registered trademark)
product No.: M32643
a base: nylon (0.3 mm thickness)
hooks: polypropylene (loop-shaped hooks with a 1.5 mm protrusion height from the surface of the base)
width: 30 mm The nonwoven fabric of the comparative example 2 was as follows:

constituting material: web . . . 6.6 dtex 95% polyester
 4.4 dtex 5% polyethylene terephthalate
latex: 100% flame-resistant phosphorus-containing acrylic fiber
thickness: 1.7 mm
width: 50 mm
weight: 195 g/m$^2$ (Test Methods)
(1) Cantilever Method In the measurement, the length of the test samples was set to 150 mm. Length-direction rigidity of each of the test samples was measured by a cantilever method, with a hook (engagement element) formation surface facing upward (hook facing upward) and with the hook formation surface facing downward (hook facing downward).

(2) Heart Loop Method

The length of the test samples was set to 250 mm (effective length 200 mm), they were fixed by a jig, and one minute later, the measurement was conducted. With the hook (engagement element) formation surface facing inward (hook facing inward) and with the hook formation surface facing outward (hook facing outward), heart loops were formed and the length-direction rigidity of each of the test samples was measured by a heart loop method.

(3) Handle-O-Meter Method

According to the JIS L 1096 E method, the test samples were each suspended in a space between a pair of plates set at a predetermined interval, a blade was moved down in the space by 8 mm from the surface of a test stand, and a value (g) of resistance encountered by the blade at this time was measured. Length-direction rigidity of each of the samples was measured by a handle-o-meter method when the plates each had a 30 mm width and the test samples were each disposed so that its length direction was along a direction perpendicular to the longitudinal direction of the space. Further, width-direction rigidity of each of the samples was measured by the handle-o-meter method when the plates each had a 16 mm width and the test samples were each disposed so that its length direction was along the longitudinal direction of the space between the plates. The measurement in the both cases was conducted, with the hook (engagement element) formation surface facing inward (hook facing inward) and with the hook formation surface facing outward (hook facing outward).

FIG. 8 shows test results of the rigidity tests.

Firstly, in the cantilever method, when the hook faced downward, the example 1 exhibited high rigidity, whose value was not measurable, but an average value when the hook faced upward was 99 mm. On the contrary, when the hook faced upward, the comparative example 1 exhibited high rigidity, whose value was not measurable, but an average value when the hook faced downward was 97 mm. So, the rigidity test by the cantilever method did not show a substantial difference between the example 1 and the comparative example 1, though there is a difference in the facing direction.

In the heart loop method, the example 1 and the comparative example 1 exhibited substantially an equal value and there was not a substantial difference therebetween.

In the handle-o-meter method, on the other hand, as for the length-direction rigidity of the test samples, the example 1 exhibited a 119 g average value when the hook faced upward and a 132 g average value when the hook faced downward, whereas the comparative example 1 exhibited a 43 g average value when the hook faced upward and a 49 g average value when the hook faced downward. Therefore, the example 1 had approximately 2.5 times to three times as high rigidity as that of the comparative example 1. As for the width-direction rigidity of the test samples, the example 1 exhibited a 99 g average value when the hook faced upward and a 120 g average value when the hook faced downward, whereas the comparative example 1 exhibited a 30 g average value when the hook faced upward and a 36 g average value when the hook faced downward. Therefore, the example 1 had approximately three times to four times as high rigidity as that of the comparative example 1.

As is apparent from the above rigidity tests, the surface fastener of the example 1 exhibited noticeably higher rigidity than the comparative example 1 in the rigidity test by the handle-o-meter method. The resistance value of the example 1 as measured by the handle-o-meter method is preferably within a range of 80 to 150 g, since the smallest measurement value is 87 g and the largest measurement value is 141 g, though the aforesaid average value is 99 to 132 g.

The resistance value measured by the handle-o-meter method, which is a test using the pressing with the blade, indicates flexural rigidity of the test samples when they are given a local concentrated load. Thus, it can be said that the surface fastener of the example 1 has higher flexural rigidity against the local concentrated load than the comparative example 1, though the rigidity of the whole test sample as measured by the cantilever method and the heart loop method has no substantial difference from that of the comparative example 1. This shows that the surface fastener 100 of the example 1 is not locally distorted and thus does not easily peel off from an engagement counterpart even if pulled in the shear direction (surface direction) while engaged with the engagement counterpart.

(Test Regarding Static Load Characteristics)

Figure 9:
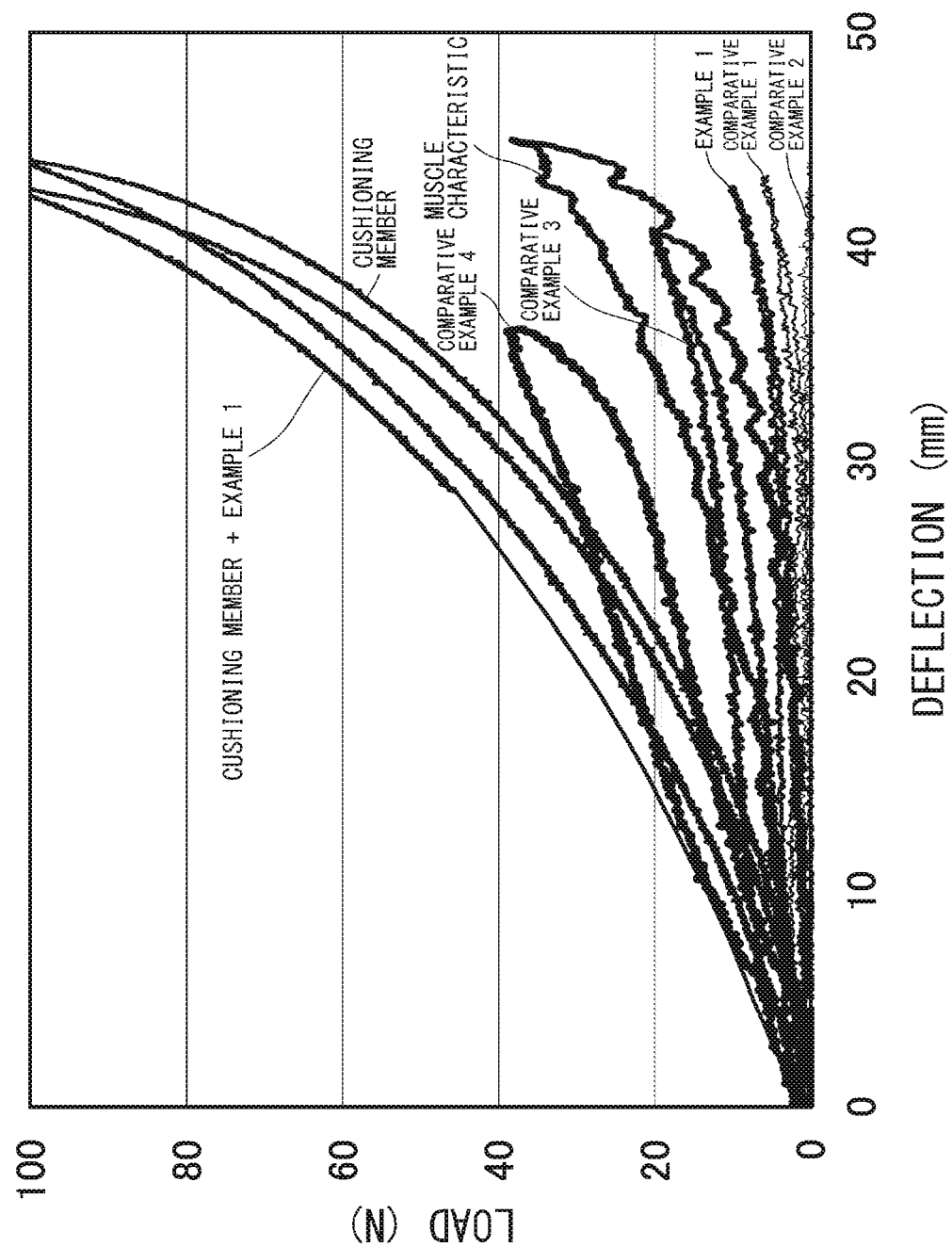
FIG. 9 is a chart showing results of a test on static load characteristics.

Next, a static load characteristic was measured from a load-deflection graph when a stack of the cushioning member 10 and the surface fastener 100 of the example 1 was pressed by a pressure plate with a 30 mm diameter. The cushioning member is formed of a polyurethane foam. FIG. 9 shows results. FIG. 9 also illustrates a characteristic of the cushioning member 10 by itself and a characteristic of the surface fastener 100 of the example 1 by itself calculated from the data obtained when the surface fastener 100 of the example 1 is stacked on the cushioning member 10. Further, static load characteristics were measured from load-deflection graphs which were obtained when the surface fastener 100 of the comparative example 1, the nonwoven fabric of the comparative example 2, a polypropylene plate member with a 1 mm thickness (comparative example 3), and a 2 mm thick plate member (comparative example 4) harder than the plate member of the comparative example 3 and bent into a U-shaped sectional shape each in a stacked state on the cushioning member 10 were each pressed by a pressure plate with a 30 mm diameter. FIG. 9 also illustrates characteristics of the comparative example 1 by itself, the comparative example 2 by itself, the comparative example 3 by itself, and the comparative example 4 by itself which were found by calculation after the above measurement. FIG. 9 also illustrates a typical example (muscle characteristic) of the static load characteristic when a pressure up to 100 N is applied to the muscle of the buttocks of a person by a pressure plate with a 30 mm diameter.

As is seen from the results, a hysteretic characteristic of the load-deflection graph when the surface fastener 100 of the example 1 is stacked on the cushioning member 10 is within a ±5% range of a hysteretic characteristic of the load-deflection graph of the cushioning member 10 by itself, and the both hysteretic characteristics depict substantially the same trajectory, when they are compared in a range where the load value is 40 N or more. On the other hand, the spring constant of the surface fastener by itself is 0.5 N/mm or less in any of deflection amount segments, and when the spring constant was calculated in various deflection amount segments, its lower values were 0 N/mm, 0.05 N/mm, 0.1 N/mm, and so on. It has been found out that the spring constant of the surface fastener by itself is equal to or less than the spring constant of the muscle of the buttocks of a person, which is within a range of roughly 0.2 to 1 N/mm. The surface fastener 100 of the example 1 has high flexural rigidity as described above, yet it satisfies the conditions that it should have high follow-up ability to the deformation of the cushioning member 10 when stacked on the cushioning member 10, and the spring constant of the surface fastener 100 by itself should be smaller than the spring constant of the muscle characteristics. Accordingly, even if the surface fastener 100 of the example 1 is disposed, a person scarcely feels its presence. On the other hand, it can exhibit a high engagement force in the shear direction owing to the aforesaid flexural rigidity that it has.

(Engagement Force Test)

Figure 10:
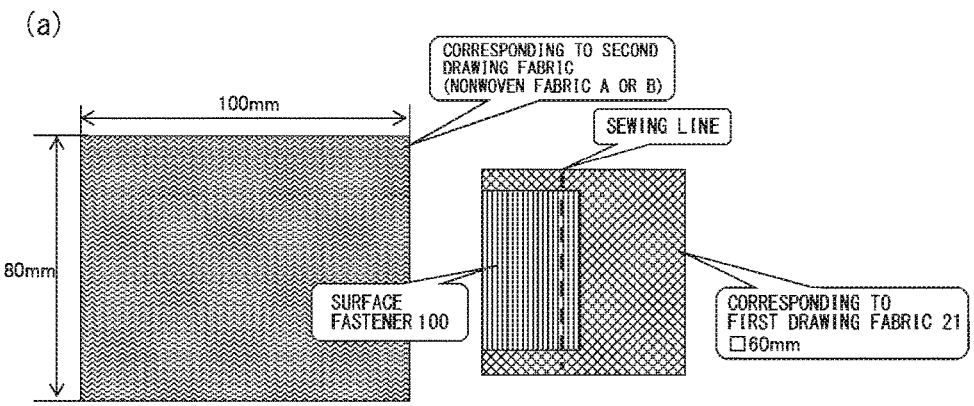
FIG. 10(a) is a view illustrating the sizes of samples used in an engagement force test.
FIG. 10(b) is a chart showing test results of the engagement force test.
Figure 11:
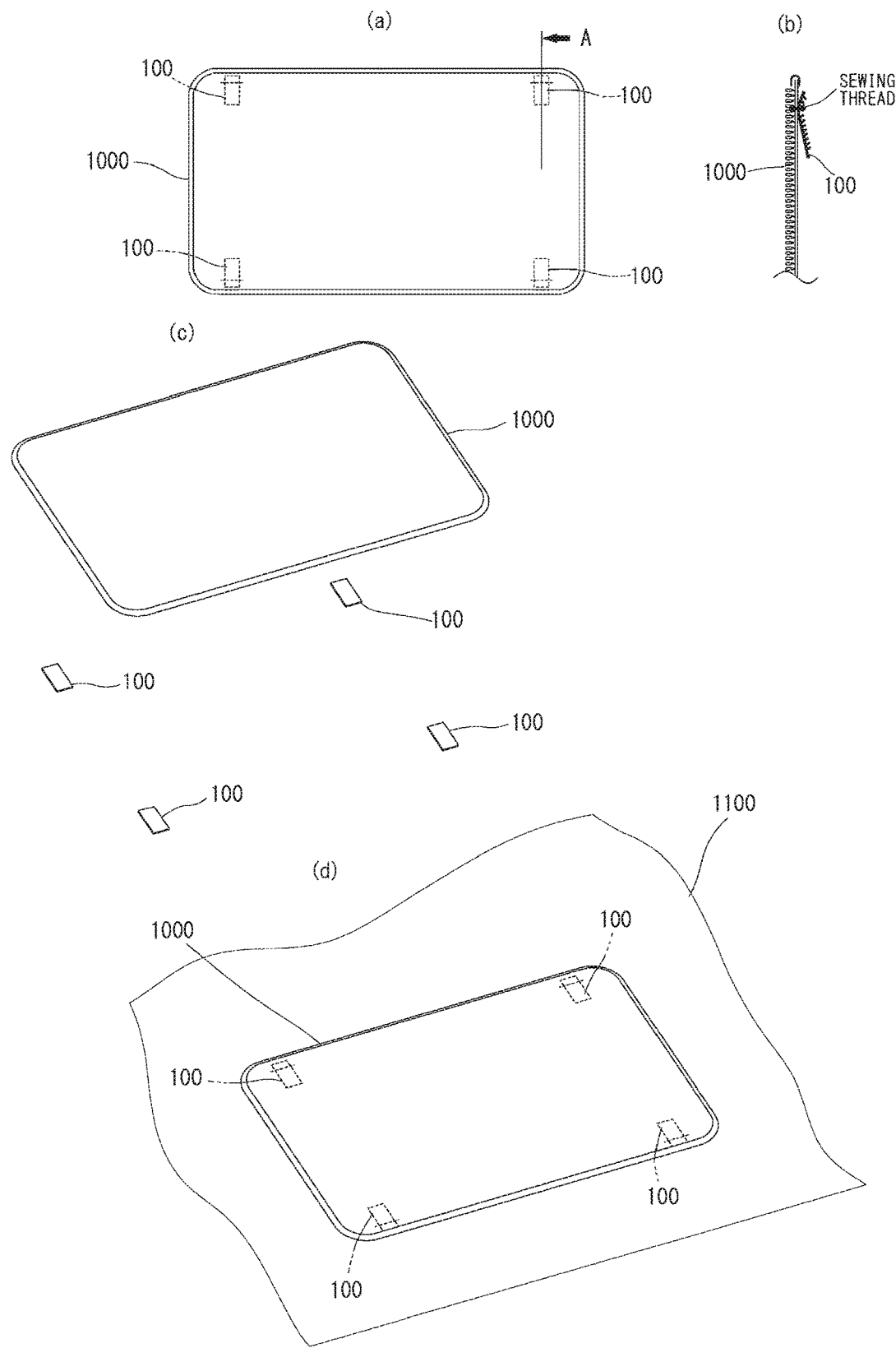
FIG. 11(a) is a plane view illustrating a mode where the surface fastener of the present invention is used to fix a floor mat.
FIG. 11(b) is a view seen in the direction of the arrow A in FIG. 11(a)
FIG. 11(c) is an exploded perspective view.
FIG. 11(d) is a perspective view illustrating a state where the floor mat is fixed to a floor carpet.

As illustrated in FIG. 10(*a*), a fabric corresponding to the first drawing fabric 21 is coupled to the surface fastener 100 of the example 1 by sewing, and nonwoven fabrics A, B corresponding to the second drawing fabric 22 were each joined to the surface fastener 100, and the engagement force was measured. The surface fastener 100 had a 50 mm length and a 30 mm width, the fabric corresponding to the first drawing fabric 21 had a 60 mm length and a 60 mm width, and the nonwoven fabrics corresponding to the second drawing fabric 22 each had an 80 mm length and a 100 mm width. The nonwoven fabric A corresponding to the second drawing fabric 22 was the nonwoven fabric of the above-described comparative example 2, and the nonwoven fabric B had a 130 (125±13) g/m² weight and a 1.35 mm thickness which were less than those of the nonwoven fabric A.

In the measurement, which was conducted in accordance with JIS L 3416, the above samples were pulled in the width direction perpendicular to the row direction of the engagement element rows 121, 131, 141 of the surface fastener 100. The measurement was conducted for a case where a tensile direction of the surface fastener 100 was a flow direction of the nonwoven fabrics A, B and for a case where the tensile direction is the width direction perpendicular to the flow direction. After the surface fastener 100 and each of the nonwoven fabrics A, B corresponding to the second drawing fabric 22 were stacked, the both were surface-compacted to be joined together by a roller with a 2 kg weight reciprocating in the flow direction of the nonwoven fabric twice, and the stacks were pulled at a tensile speed of 300 mm/min. FIG. 10(b) shows results.

As is seen in FIG. 10(b), in the case of the nonwoven fabric A, shear strength, 5° peel strength, and 10° peel strength had high values of 10 N/cm² or more. 45° peel strength was about ½ of the shear strength, the 5° peel strength, and the 10° peel strength. The peel strength and perpendicular strength were about ¼ of the shear strength, the 5° peel strength, or the 10° peel strength. Incidentally, in the measurement of the perpendicular strength, the samples were each pasted on a SUS plate with an adhesive tape. A perpendicular insertion pressure was set to 50 N/engagement area.

In the case of the nonwoven fabric B, the shear strength was about 8 N/cm² and thus lower than in the case of the nonwoven fabric A. Therefore, the nonwoven fabric A is preferably used as a mate member (second drawing fabric 22) engaged with the surface fastener 100 of the example 1. However, the nonwoven fabric B has shear strength about four times as high as the peel strength and the perpendicular strength, and thus even if the nonwoven fabric B is the mate member, a high engagement force can be exhibited in the shear direction.

From the above, it follows that the surface fastener of the present invention exhibits a high engagement force when used so as to be pulled in the shear direction at 100 or less (150 or less in calculation).

(Application Examples of Present Invention)

The surface fastener of the present invention exhibits a high engagement force as described above. Therefore, it can be used not only for fixing the covering member to the cushioning member but also as a means for fixing a floor mat 1000 laid on a floor of a vehicle such as an automobile as illustrated in FIGS. 11(a) to (d), for instance. A metal surface of a floor surface of especially an automobile is not exposed as it is but is covered with a floor carpet 1100, and thus the engagement elements 121a, 131a, 141a of the surface fastener 100 are engageable therewith. Specifically, the surface fasteners 100 illustrated in FIG. 2 and FIG. 3 are stacked on the floor mat, with the rear surfaces of the bases 110 being on the rear surface of the floor mat, and are fixed to the floor mat by sewing, bonding, or the like, preferably by sewing, and the engagement elements 121a, 131a, 141a are engaged with the floor carpet 1100. A possible alternative structure, not illustrated, is to fix the surface fasteners 100 on the floor carpet 1100 side in advance and engage the engagement elements 121a, 131a, 141a with the rear surface of the floor mat 1000.

If displaced, the floor mat 1000 at the driver seat will be a factor to interfere with the accelerator pedal or the brake pedal, but the surface fastener 100 of the present invention is effective for preventing the displacement of the floor mat 1000 because of its high engagement force in the shear direction as described above.

The surface fastener 100 for preventing the displacement of the floor mat 1000 does not usually give a feeling of something foreign to a person when disposed on the rear surface of the floor mat 1000, and thus a high engagement force in the shear direction is considered as more important. Accordingly, surface fasteners 100 in modes having the following structures in the above-described structure of the surface fastener 100 are suitable for preventing the displacement of the floor mat 1000.

Specifically, in a surface fastener 100 according to a first mode suitable for preventing the displacement of the floor mat 1000, engagement elements provided on a base include tilting engagement elements standing obliquely from the base, and the surface fastener 100 includes a tilting engagement element group as the aforesaid engagement element group, including at least one tilting engagement element row as the aforesaid engagement element row, composed of the plural tilting engagement elements arranged in a row.

In a surface fastener 100 according to a second mode, engagement elements provided on a base include vertical engagement elements standing substantially vertically from the base, the surface fastener 100 including: a vertical engagement element group as the aforesaid engagement element group, including at least one vertical engagement element row as the aforesaid engagement element row, composed of the plural vertical engagement elements arranged in a row, and the engagement elements provided on the base include tilting engagement elements standing obliquely from the base, the surface fastener 100 including a tilting engagement element group as the aforesaid engagement element group, including at least one tilting engagement element row as the aforesaid engagement element row, composed of the plural tilting engagement elements arranged in a row.

Preferably, in both of the surface fasteners 100 according to the first mode and the second mode, the tilting engagement element group includes a first tilting engagement element group and a second tilting engagement element group each having at least one tilting engagement element row, and first tilting engagement elements belonging to the first tilting engagement element group and second tilting engagement elements belonging to the second tilting engagement element group tilt in opposite directions to each other.

Note that, even in the application for preventing the displacement of the floor mat 1000, the surface fastener 100 may give a feeling of something foreign if the engagement elements 121a, 131a, 141a are too high, and thus it is of course preferable that the surface fastener has the same physical properties as those of the above-described embodiment, regarding the thickness of the base 110, the protrusion height of the engagement elements 121a, 131a, 141a, the resistance value measured by the handle-o-meter method, the hysteretic characteristic of the load-deflection graph, the spring constant, and so on. Further, the surface fastener 100 is desirably as thin as possible since an excessively high thickness of the surface fastener 100 involves a problem of an increase of the height of the floor mat 1000 (an increase of the total thickness of the floor mat 1000 and the surface fastener 100). Further, in a case where the surface fastener 100 is fixed to a portion having slight irregularities such as the periphery of a cover of a bracket of a slider, the surface fastener 100 desirably has flexibility or softness so as to deform along the shape of this portion, in order to increase joining strength. In this respect, one having the physical properties of the above-described embodiment is especially preferable since it is thin and flexible and has a high engagement force in the shear direction. Further, the floor mat is not limited to that for vehicles but may be that used in a place inside a building such as an entrance, a bathroom, or a kitchen, that used outdoors, and the like. If a material with which the engagement elements of the surface fastener are engageable is provided on a corresponding floor surface, the surface fastener is also useful for preventing a floor mat on the floor surface from slipping.

INDUSTRIAL AVAILABILITY

The surface fastener of the present invention is usable as the fixing means for various kinds of articles as described above, and in addition, is usable for moving an article having a material surface corresponding to the loop side with which the surface fastener of the present invention is engageable, such as a nonwoven fabric, in a desired direction by being engaged with the article. For example, the surface fastener is usable for pulling the article out of a casing (for example, a dispenser of tissue paper or other paper, or towel or other fabrics), for moving the article from a certain position to another position, or for other such purposes.

EXPLANATION OF REFERENCE SIGNS 1 cushioning structure
10 cushioning member
20 outer layer member
21 first drawing fabric
22 second drawing fabric
100 surface fastener
110 base
120 vertical engagement element group
121 vertical engagement element row
121a vertical engagement element
130 first tilting engagement element group
131 first tilting engagement element row
131a first tilting engagement element
140 second tilting engagement element group
141 second tilting engagement element row
141a second tilting engagement element
150 elementless portion Then invention claimed is:

1. A surface fastener which is used while stacked on a cushioning member to fix a covering member to the cushioning member that is to be covered,
the surface fastener being formed of a synthetic resin and comprising an integrally molded base with a 0.1 to 0.9 mm thickness and an engagement element group including at least one engagement element row composed of a plurality of protruding engagement elements with a 0.2 to 0.8 mm protrusion height arranged in a row on one surface of the base,
wherein a resistance value of the surface fastener as measured by a handle-o-meter method conforming to the JIS L 1096 E method is within an 80 to 150 g range, and
wherein, when a load value is 40 N or more, a hysteretic characteristic of a load-deflection graph which is obtained when a pressure up to 100 N is applied to a stack of the surface fastener and the cushioning member by a pressure plate with a 30 mm diameter is within a ±5% range of a hysteretic characteristic of a load-deflection graph which is obtained when the pressure is applied only to the cushioning member under the same condition, and a spring constant of the surface fastener by itself is 0.5 N/mm or less.

2. The surface fastener according to claim 1, wherein the base is coupled to a predetermined position of a joining counterpart has a portion contributing to an occurrence of a bending point.

3. The surface fastener according to claim 2, wherein the base has a portion where a modulus of section sharply changes by a 5 to 50% range, and the portion is a portion contributing to the occurrence of a bending point.

4. The surface fastener according to claim 3, wherein the base is coupled to the predetermined position of the joining counterpart by sewing and due to perforations formed by the sewing, the base has a portion where the modulus of section is in a 50 to 95% range of a modulus of section before the sewing, and the portion is the portion where the modulus of section sharply changes.

5. The surface fastener according to claim 1, wherein the synthetic resin is a polyester elastomer resin.

6. The surface fastener according to claim 1,
wherein the engagement elements include tilting engagement elements standing obliquely from the base, the surface fastener comprising
a tilting engagement element group as the engagement element group, including at least one tilting engagement element row as the engagement element row, composed of the plural tilting engagement elements arranged in a row.

7. The surface fastener according to claim 6,
wherein the tilting engagement element group includes a first tilting engagement element group and a second tilting engagement element group each including at least one row of the tilting engagement element row, and
wherein first tilting engagement elements belonging to the first tilting engagement element group and second tilting engagement elements belonging to the second tilting engagement element group tilt in directions opposite to each other.

8. The surface fastener according to claim 7,
wherein a boundary portion between the first tilting engagement element group and the second tilting engagement element group is an elementless portion not having the tilting engagement element, and the elementless portion is coupled to the predetermined position of a joining counterpart.

9. The surface fastener according to claim 1,
wherein the engagement elements include vertical engagement elements standing substantially vertically from the base, the engagement element group compromising;
a vertical engagement element group, including at least one vertical engagement element row as the engagement element row, composed of the plural vertical engagement elements arranged in a row, and wherein the engagement elements include tilting engagement elements standing obliquely from the base, and a tilting engagement element group, including at least one tilting engagement element row as the engagement element row, composed of the plural tilting engagement elements arranged in a row.

10. The surface fastener according to claim 9, wherein the tilting engagement element group includes a first tilting engagement element group and a second tilting engagement element group each including at least one row of the at least one tilting engagement element row, and wherein first tilting engagement elements belonging to the first tilting engagement element group and second tilting engagement elements belonging to the second tilting engagement element group tilt in directions opposite to each other.

11. The surface fastener according to claim 10, wherein a boundary portion between the first tilting engagement element group and the second tilting engagement element group is an elementless portion not having the tilting engagement element, and the elementless portion is coupled to the predetermined position of joining counterpart.

12. A cushioning structure in which a cushioning member is covered with a covering member, the cushioning structure comprising the surface fastener of claim 1 which is coupled to a predetermined position of the covering member and via which the cushioning member is covered with the covering member.

13. A seat structure in which a cushioning structure is disposed in a seat cushion part or a seat back part, the seat structure comprising, as the cushioning structure, the cushioning structure according to claim 12.

14. The seat structure according to claim 13, wherein an outer layer member is used as the covering member included in the cushioning structure, and the cushioning member is covered with the outer layer member via the surface fastener.

15. The cushioning structure according to claim 12, wherein the surface fastener is located on a surface opposite to a load support surface of the cushioning member, and tension generated when a load is applied to the cushioning member causes tilting engagement elements to further tilt in such a direction as to have increased engagement forces with an engagement counterpart.

16. The cushioning structure according to claim 15, wherein an elementless portion of the surface fastener is located on the surface opposite to the load support surface of the cushioning member, and when the load is applied to the cushioning member, the elementless portion deflects in a pressing direction of the applied load, and first tilting engagement elements belonging to a first tilting engagement element group and second tilting engagement elements belonging to a second tilting engagement element group, which tilting engagement elements tilt in the opposite directions, further tilt in such directions as to have increased engagement forces with the engagement counterpart.

* * * * *